Figure 1:
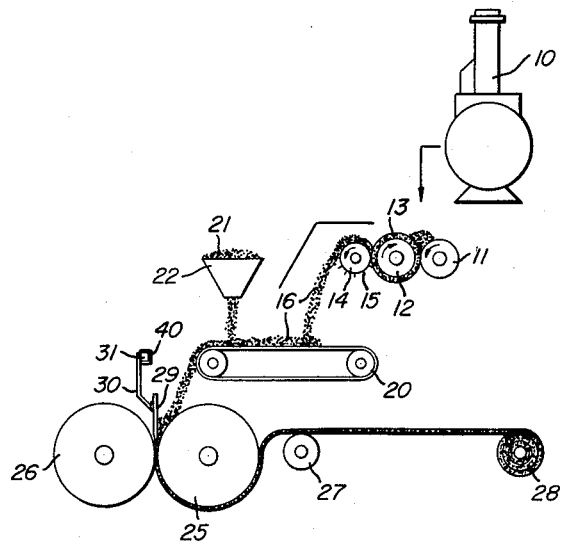

Aug. 18, 1964　　　W. H. POWELL　　　3,145,241
METHOD FOR PRODUCING DECORATIVE SHEET MATERIAL
Filed June 24, 1960　　　　　　　　2 Sheets-Sheet 1

INVENTOR.
WILLIAM H. POWELL
BY
ATTORNEY

INVENTOR.
WILLIAM H. POWELL

United States Patent Office 3,145,241
Patented Aug. 18, 1964

3,145,241
METHOD FOR PRODUCING DECORATIVE
SHEET MATERIAL
William H. Powell, Livingston, N.J., assignor to Congoleum-Nairn Inc., Kearny, N.J., a corporation of New York
Filed June 24, 1960, Ser. No. 38,662
4 Claims. (Cl. 264—76)

This invention relates to the production of flexible resilient surface coverings and particularly to a process for preparing such surface coverings having a non-directional decoration throughout the wear layer.

Resilient composition coverings are prepared by mixing synthetic and/or natural resins, plasticizers, fillers, pigments and the like. This mixing is usually accomplished by heating the components to a temperature sufficient to soften the resinous portion of the components and form a homogeneous mixture. The composition is then sheeted by passing between calender rolls, the sheet disintegrated to form small granules and the granules commingling with granules similarly prepared of contrasting coloration. The commingled granules are then subjected to one or more calendering operations to produce a finished sheet, such a sheet usually ranges in thickness from about 0.015 to about 0.125 inch. In a calendering operation, the individual granules largely retain their individual colors but are subject to substantial distortional commingling. This distortional commingling is evidenced in the product of the first calender in that the granules have become stretched out into long streaks to provide a striated effect which is commonly known as "jaspe." This elongation is primarily due to the extrusion of the granules between the calender rolls. In order to form a solid sheet free of voids and other defects, it is usually necessary to feed an excess of granules to a calender roll above that required to form a sheet. This presence of an excess of granules at the nip of the calender rolls causes the granules to be forced between the rolls and thereby distorted. A number of attempts have been made to limit the quantity of granules fed to the calender rolls since in theory if only sufficient granules are fed to the calender rolls to produce a finished sheet, distortion of particles will not take place. One method for accomplishing this result has been the application of a uniform layer of granules on a conveyor which conveys them to the calender rolls at such a rate as to have only sufficient granules to form the desired sheet. This system is difficult to control since it requires an extremely flat conveyor and a complex system for limiting the depth of granules on the conveyor. In addition, the speed of the conveyor belt must always be kept in unison with the calender rolls. Since the composition of the granules can vary widely, the speed of the calender rolls is quite often varied to compensate for the composition which would necessitate correspondingly varying the speed of the conveyor belt.

An object of the invention is to provide a simple and economical process for producing a flexible, smooth composition surface covering having an overall multicolored, non-directional decoration. Another object of the invention is to provide such a process adaptable to high-speed calendering operations. A further object of the invention relates to the provision of an improved method of making a composition sheet having areas of contrasting coloration, each area being sharply defined from each other area. Other objects and the advantages of the invention will appear in the following detailed description.

In accordance with the invention, a flexible composition surface covering having an overall non-directional decoration is produced by supplying a mixture of different colored granules of plastic composition to the nip of two calender rolls while simultaneously limiting the passage of the granules through the rolls to form a sheet by utilizing a vibrating baffle plate which extends toward the nip of the calender rolls. The baffle plate is constructed to severely limit the supply of granules to the calender roll thereby serving as a metering device. In order to accomplish such metering, it is essential to continuously oscillate the baffle plate. If the baffle plate is not oscillated, the granules will bridge or interlock between the calender rolls and the baffle and interrupt the feed thereby forming a sheet with voids.

Figure 2:
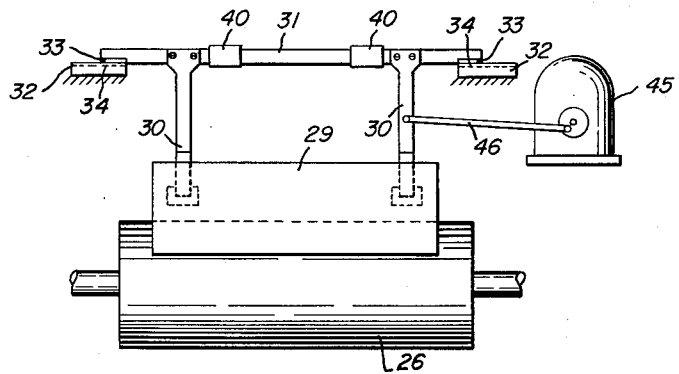
Figure 3:
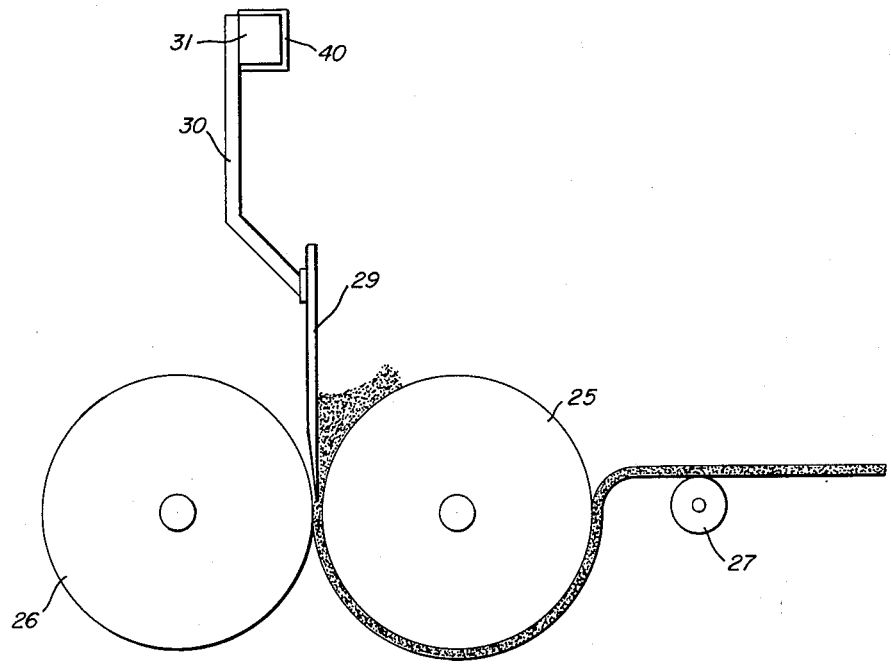

The invention will be better understood from the detailed description when read in conjunction with the accompanying drawings wherein:

FIGURE 1 is a schematic representation of a two-roll calender showing the oscillating baffle and the granular feed, FIGURE 2 is an elevational view of a two-roll calender with the front roll removed to show the oscillating baffle, and FIGURE 3 is an enlarged view of the baffle shown in FIGURE 1.

Referring to the drawings, the composition is blended together to form a homogeneous mass in a mixer 10 such as a Banbury mixer. During mixing, external and/or internal heat causes the composition to become plastic. When mixing is complete, the mass is dropped between the nip of two horizontal calender rolls 11 and 12. The composition is allowed to form a thick sheet 13 on the front roll 12. Granules of composition are then formed from this sheet by means of a roll 14 having a number of pins 15 extending from its surface. The pin roll 14 is revolved rapidly so that the pins pass through the sheet of composition on the roll 12 in the same direction as the sheet is traveling thereby gouging granules 16 out of the thick sheet 13. This operation is disclosed and claimed in United States Patent No. 2,917,780 which issued December 22, 1959 to Robert K. Petry. The granules 16 are deposited on a conveyor belt 20 which conveys them to a point where decorative granules 21 of contrasting colors are dropped from the hopper 22 on the conveyor belt 20 with the granules 16. The conveyor belt discharges the mixture of colored granules between a baffle plate 29 and one roll 25 of a two-roll horizontal calender 25 and 26. The baffle plate is supported by vertical arms 30 affixed to a cross-arm 31 secured to the frame 32 of the calender. The cross-arm is supported on resilient rubber pads 33 and maintained in channels 34 to allow free movement of the baffle plate in all directions. A vibrating force is supplied to the baffle by means of electro-magnets 40 positioned adjacent to the baffle which oscillate the baffle 29 at a high rate causing the space between the plate and one calender roll 25 to continuously change through a small increment. A second oscillating motion can be applied to the baffle in a direction parallel to the axis of the two rolls by means of a motor 45 through an eccentric and connecting rod 46 affixed to one of the vertical supports 30. The oscillation of the baffle 29 should be rapid enough so as to insure a smooth, uniform flow of a thin layer of granules to the nip of the calender rolls.

Using this procedure, the granules are consolidated into a sheet by the rolls 25 and 26 without any substantial distortion of the granules throughout the thickness of the sheet. The sheet is allowed to follow one of the rolls 25 and is then removed from the roll by means of a take-off roll 27. After cooling, the sheet is wound on a collecting roll 28.

The distance between the nip of the calendar rolls and the bottom of the baffle is determined by the size of the granules and the gauge or thickness of the sheet to be produced on the calender. The formulation of the composition will also affect the position of the baffle in that softer compositions require severer limitations than harder compositions because of the ease of distortion.

As indicated above, the baffle is oscillated by means of an electro-magnet in one direction and a motor in the other direction although other oscillating methods can be utilized. The frequency of vibration is not critical to the invention except that it must be sufficiently rapid to insure a uniform feed of granules to the calender rolls. The size of the granules utilized in the process is also not critical to the invention. The larger the granules, however, the more difficult it is to insure a uniform sheet free of voids. Likewise, with smaller granules greater difficulty is encountered in producing a design having distinguishable colored areas. The granules vary from fine particles having a size from about 0.02 to about 0.06 inch in diameter up to granules having the larger dimension of one-half inch or more. It is preferred, however, to use granules within the range of about 0.10 to about 0.50 inch in diameter. The thickness of the granules is preferably less than the thickness of the sheet to be formed. The following example is given for purposes of illustration:

EXAMPLE I

Particles are prepared by mixing the following components at 350° F., followed by sheeting between calender rolls and breaking up of the calendered sheet into the particles.

|  | Percent |
|---|---|
| Polyvinyl Chloride Resin (Viscosity 0.27) | 25.4 |
| Plasticizer (Dipropylene Glycol Di-Benzoate) | 12.4 |
| Stabilizer (Barium-Cadmium) (Epoxidized Resin Epon 1004 [1]) | 1.5 |
| Lubricant (Stearic Acid) | 1.0 |
| Limestone | 58.7 |
| Pigments | 1.0 |

[1] Shell Chemical Corp., 50 W. 50th Street, New York 20, N.Y.

Granules of about 1/8 inch in diameter and larger particles of about 1/4 inch square and approximately 0.025 inch thick of three distinct colors made by the above procedure are mixed together. The granules are then heated to 325° F. and fed to a horizontal calender to produce a sheet having a thickness of 0.03 inch. The calender rolls having a diameter of 12 inches are heated to a temperature of about 210° F. A baffle of wood having a thickness of 1/4 inch is suspended above the calender rolls to allow free movement. The baffle is tapered at the bottom to a knife edge and extends to a point on the radius of the rolls where the separation between the rolls is approximately 1/8 inch. The steel magnetic arm is attached to the baffle approximately 8 inches from the top and an electro-magnet is positioned 1/8 inch from the steel arm. The electro-magnet is vibrated at a frequency of 3600 cycles per minute. The vibrating baffle limits the feed of granules to the calender rolls allowing the production of a sheet having a relatively non-directional multicolored decoration.

Any departure from the foregoing description which conforms to the present invention is intended to be included within the scope of the claims.

What is claimed is:
1. In a method for producing a multicolored homogeneous composition sheet having a substantially non-directional decoration by feeding a mixture of colored granules through the nip of a consolidating sheeting calender thereby forming said granules into said homogeneous sheet, the improvement which comprises reducing the elongation of said granules by said calender by limiting the flow of said granules to said nip to a thin, uniform stream only sufficient to form said sheet and continuously oscillating said colored granules immediately above said nip by the application of an oscillating motion thereto in a direction perpendicular to the plane passing through said nip.

2. In a method for producing a multicolored homogeneous composition sheet having a substantially non-directional decoration by feeding a mixture of colored granules through the nip of a consolidating sheeting calender thereby forming said granules into said homogeneous sheet, the improvement which comprises reducing the elongation of said granules by said calender by limiting the flow of said granules to said nip to a thin, uniform stream only sufficient to form said sheet by feeding said granules between the space formed by one of said calender rolls and a baffle plate extending to said nip and continuously oscillating said granules by applying an oscillating motion to said baffle in a direction perpendicular to the plane passing through said nip.

3. The method of claim 2 wherein said baffle is oscillated rapidly over a small amplitude by means of an electromagnet.

4. In a method for producing a multicolored homogeneous vinyl composition sheet having a substantially non-directional decoration by feeding a mixture of colored granules of vinyl composition through the nip of a consolidating sheeting calender thereby forming said granules into said homogeneous sheet, the improvement which comprises reducing the elongation of said granules by said calender by limiting the flow of said granules to said nip to a thin, uniform stream only sufficient to form said sheet and continuously oscillating said colored granules immediately above said nip by the application of an oscillating motion thereto in a direction perpendicular to the plane passing through said nip.

References Cited in the file of this patent

UNITED STATES PATENTS

| 2,260,453 | Hartman | Oct. 28, 1941 |
| 2,651,076 | Hornbosted | Sept. 8, 1953 |
| 2,740,991 | Hess et al. | Apr. 10, 1956 |
| 3,017,665 | Dasher et al. | Jan. 23, 1962 |

FOREIGN PATENTS

| 524,140 | Belgium | May 10, 1954 |
| 929,754 | Germany | July 4, 1955 |

OTHER REFERENCES

German allowed application, F13741 Ib/491, Sept. 20, 1956 (2 pp. spec.; 1 sht. drwg.).